United States Patent Office 3,499,735
Patented Mar. 10, 1970

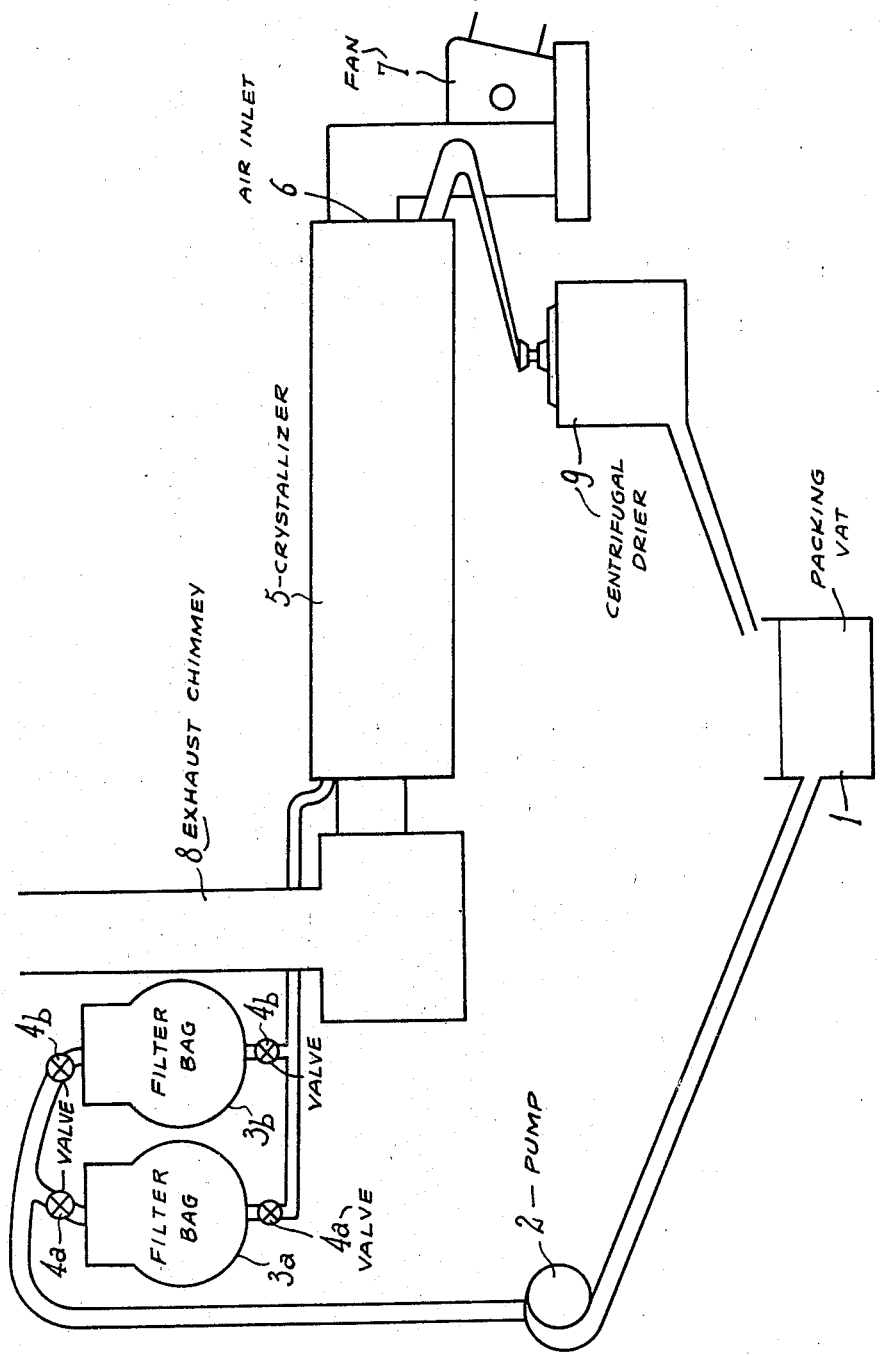

3,499,735
TREATMENT OF SILICON-STEEL PICKLING BATHS
Henri Marcel Robert, Saint-Chely d'Apcher, France, assignor to Compagnie des Ateliers et Forges de la Loire, St. Chamond-Firminy, St. Etienne-Jacob Holtzer
Filed Feb. 8, 1966, Ser. No. 525,938
Int. Cl. C01b *17/19;* C01g *49/14;* C23g *1/36*
U.S. Cl. 23—299                                        4 Claims

ABSTRACT OF THE DISCLOSURE

A process for the treatment of sulfuric acid containing liquor resulting from a silicon-steel pickling bath, for the purpose of recovering iron sulfate therefrom and to enable the recycling of the acid treating liquor, the improvement according to which the residual liquor coming from the baths used for the pickling of the silicon steel and containing hydrated silica is first passed through a filtering means which is a textile cloth of polyester fibers formed from terephthalic acid and ethylene glycol whereby the hydrated silica is separated in the form of a gel, said residual liquor being maintained at substantially the same temperature as that at which it leaves the pickling bath, and then in a subsequent step separating the iron sulfate present in the residual liquor by crystallization by cooling, followed by drying and recovering the pickling liquor in order to recycle it to the bath utilized for the treatment of the silicon steel.

---

This invention relates to methods of treating silicon-steel pickling baths.

It is conventional to treat the high iron-sulfate acid liquor from steel pickling baths with a sulfuric acid solution with a view to recover hydrated iron sulfate ($FeSO_4 \cdot 7H_2O$) by causing this liquor issuing from the pickling vats to flow in succession through a pump, then through a cooling crystallizer and finally through a centrifugal drier.

The crystallizer is adapted to cool in such a way that the acid liquor which was not saturated with iron sulfate when entering the crystallizer produces, by cooling, hydrated iron sulfate crystals remaining in suspension in a cooler, iron-sulfate saturated liquor at the output temperature. The centrifugal drier following the crystallizer separates the crystals from the saturated liquor, the latter being re-used in the pickling vats where reheating will remove its iron-sulfate saturation at pickling temperature.

This process is applicable without any inconvenience, for pickling nearly all grades of steel products, for example mild steels.

However, in the case of silicon steels, this pickling liquor regeneration is attended by a serious inconvenience: In fact, the said acid liquor issuing from the pickling bath contains not only iron sulfate but also gelatinous hydrated silica $SiO_2 \cdot H_2O$. Now this silica is not separated by the drier. It is thus recycled with the acid liquor, the latter being gradually enriched with silica until it is no longer possible on the one hand to properly pickle the sheet and on the other hand to centrifuge the acid liquor.

Under these conditions it is the essential object of the present invention to provide a method of treating silicon-steel pickling baths whereby the detrimental silica can be eliminated.

To this end, the present invention provides a method of treating the liquor from the silicon-steel pickling baths for recovering the iron sulfate therefrom, this method consisting in eliminating by filtration any hydrated silica present in said liquor in gel form, in conjunction with said iron sulfate.

According to a preferred form of embodiment of the method of this invention the removal by filtration of any hydrated silica present in gel form in the liquor from the pickling bath is accomplished before the iron sulfate crystallization and before the subsequent centrifugal separation of the resulting crystals.

This invention is also concerned with an equipment for carrying out the method broadly set forth hereinabove. This equipment for recovering iron sulfate from the sulfuric liquor issuing from the silicon-steel pickling vat comprises a pump, a cooling crystallizer and a centrifugal drier, and is characetrized in that a silica filtering device is interposed between the pump and the cooling crystallizer.

In addition to the above-mentioned provisions, this invention also comprises other features and advantages as will appear from the following description.

This invention is concerned more particularly with the methods and equipments for treating silicon-steel pickling baths, according to the above-disclosed arrangements and provisions, and also with the elements for carrying out these methods and constructing these equipments, and any assemblies incorporating said methods and equipments.

Of course, the attached drawing and the corresponding descriptions should not be construed as limiting the field of the invention, as they are given by way of example to which many modifications may be brought without departing from the spirit and scope of the invention.

Referring to the single figure of the attached drawing, from the pickling vat 1 filled with sulfuric pickling liquor, the latter is drawn by a pump 2 and forced through a filtration device. This filtration device may advantageously consist of a plurality of bags made of textile material capable of retaining with an adequate efficiency a silica gel, for example the textile material known as polyester fiber (made e.g. from terephthalic acid and ethylene glycol and commercially available as Tergal, Terylene, Dacron, etc.) These bags are mounted in parallel to one another. The filter proper may be constructed according to different techniques and may consist, for example, of a drum or a wire mesh structure, or any other adequate filtration device or material capable of retaining a hydrated silica gel.

According to a preferred form of embodiment of the equipment constituting the essential object of the present invention and as shown in the drawing, the equipment comprises two series of polyester fiber (e.g. Tergal) bags 3a, 3b mounted in parallel and operating by turns; in fact, the sulfuric pickling liquor is fed to filter 3a by opening the valves 4a, while valves 4b provided at the inlet and outlet of the other series of bags constituting the adjacent filter 3b are closed, the bags of this filter 3b being subjected to a cleansing treatment meanwhile in order to remove any silica gel previously retained therein. The liquor is thus freed in the bags 3a of any silica contained therein and subsequently flows into the crystallizer 5 which, in the form of embodiment illustrated, consists of a rotary drum slightly inclined to the horizontal and receiving therein under countercurrent conditions cold air blown through an inlet 6 from a fan 7. After flowing through the crystallizer 5 and the blown air is exhausted through a chimney 8.

At the inlet end of the crystallizer the acid liquor temperature is about 75° C., and will drop to about 25° C. at the outlet end. When entering into the centrifugal drier this liquor contains about 120 grams of iron per liter in the form of $FeSO_4 \cdot 7H_2O$. When flowing out from this drier it contains only 70 g. of iron per liter.

As the crystals separated by the centrifugal drier are recovered, the liquor is returned, for example by simple gravity feed, to the pickling vats in which it is re-used for pickling silicon steels before being again recycled for recovering the iron sulfate.

From the above description it is clear that irrespective of the specific form of embodiment and construction selected for carrying out this invention, the methods and equipments for treating silicon-steel pickling baths thus obtained are characterized by essential advantages over hitherto known methods and equipments, notably in that they permit, through the removal of the silica content in conjunction with the removal the iron sulfate from the acid liquor after a pickling operation, the recycling of the treatment acid liquor and a satisfactory recovery of $FeSO_4$ by centrifugal drying.

As will readily appear from the foregoing, this invention should obviously not be construed as being limited by the specific forms of application and/or embodiment thereof which have been described, illustrated and suggested herein, since many modifications and variations may be brought thereto without departing from the spirit and scope of the invention as set forth in the appended claims.

What is claimed is:

1. In a process for the treatment of sulfuric acid containing-liquor resulting from a silicon-steel pickling bath, for the purpose of recovering iron sulfate therefrom and to enable the recycling of the acid treating liquor, the improvement according to which the residual liquor coming from the baths used for the pickling of the silicon steel and containing hydrated silica is first passed through a filter, which is a textile cloth of polyester fibers formed from terephthalic acid and ethylene glycol, whereby the hydrated silica is separated in the form of a gel, said residual liquor being maintained at substantially the same temperature as that at which it leaves the pickling bath, and then in a subsequent step separating the iron sulfate present in the residual liquor by crystallization by cooling, followed by centrifugal drying to separate the iron sulfate crystals and subsequently recovering the pickling liquor in order to recycle it to the bath utilized for the treatment of the silicon steel.

2. The improvement according to claim 1 in which the filtering means comprises a series of filters wherein each filter is used successively in one filtering phase to precipitate the hydrated silica gel and then in a cleaning phase to remove the hydrated silica gel therefrom.

3. The improvement according to claim 1 in which the hydrated-silica containing residual liquor coming from the silicon-steel pickling bath is maintained at a temperature of the order of 75° C. at which the hydrated silica present in the residual liquor precipitates in a filterable form, separating the precipitated hydrated silica in gel form, from the pickling liquor, with the aid of filtering means capable of retaining the silica gel, and constituted by a plurality of bags of textile material mounted in a parallel, then separating the iron sulphate present in the residual liquor coming from the pickling of the silicon steel, by crystallization by cooling, followed by drying and recovering the pickling liquor in order to recycle it to the baths for the treatment of the silicon steel.

4. The improvement according to claim 1 wherein the filtering means capable of retaining the hydrated silica gel is comprised of a wire mesh structure.

References Cited

UNITED STATES PATENTS

| | | | |
|---|---|---|---|
| 1,515,799 | 11/1924 | Stevenson | 23—305 |
| 2,017,773 | 10/1935 | Smith | 23—305 |
| 2,322,134 | 6/1943 | Hodge | 23—305 |
| 2,616,790 | 11/1952 | Swindin | 23—305 |
| 1,854,628 | 4/1932 | Sheldon | 148—110 |

NORMAN YUDKOFF, Primary Examiner

U.S. Cl. X.R.

23—182, 305; 148—110; 210—73